United States Patent
Buese et al.

(10) Patent No.: US 9,574,799 B2
(45) Date of Patent: *Feb. 21, 2017

(54) EXTRACTOR AND CONCENTRATOR

(71) Applicant: Continuous Extractions, LLC, Micanopy, FL (US)

(72) Inventors: Mark A. Buese, Gainesville, FL (US); Rudy Strohschein, Micanopy, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,488

(22) Filed: Dec. 9, 2015

(65) Prior Publication Data
US 2016/0091226 A1  Mar. 31, 2016

Related U.S. Application Data

(63) Continuation-in-part of application No. 13/840,546, filed on Mar. 15, 2013, now Pat. No. 9,242,189.

(60) Provisional application No. 61/736,211, filed on Dec. 12, 2012.

(51) Int. Cl.
| | |
|---|---|
| *B01D 11/02* | (2006.01) |
| *F25B 13/00* | (2006.01) |
| *B01D 5/00* | (2006.01) |
| *B01D 11/00* | (2006.01) |

(52) U.S. Cl.
CPC ........... *F25B 13/00* (2013.01); *B01D 11/0219* (2013.01); *B01D 11/0284* (2013.01); *B01D 11/0296* (2013.01); *B01D 2011/007* (2013.01)

(58) Field of Classification Search
CPC . B01D 11/02; B01D 11/0219; B01D 11/0284; B01D 11/0296; B01D 2011/007; B01D 19/0057; B01D 19/0042; B01D 19/0094; B01D 21/26; B01D 21/267; B01D 41/12; B01D 41/18; B01D 53/24; F28D 21/0001; F28D 21/0012; F28D 2021/0061; F28D 2021/0063; F28D 2021/0064; F28D 2021/0066; B04C 5/14; B04C 5/185
See application file for complete search history.

(56) References Cited

U.S. PATENT DOCUMENTS

| | | |
|---|---|---|
| 5,512,285 A | 4/1996 | Wilde |
| 2004/0089321 A1 | 5/2004 | Stone |
| 2009/0050548 A1 | 2/2009 | Shirkhan |
| 2009/0139399 A1* | 6/2009 | Kang ............... B01D 45/12 95/24 |
| 2009/0166175 A1 | 7/2009 | Waibel et al. |

OTHER PUBLICATIONS

Agilent Technologies. "Diffusion Pumps." Dec. 8, 2014, pp. 1-35.*

* cited by examiner

*Primary Examiner* — Katherine Zalasky
(74) *Attorney, Agent, or Firm* — Saliwanchik, Lloyd & Eisenschenk

(57) ABSTRACT

Extraction units are constructed having at least one extraction chamber containing extractable material. The extract is continuously separated from the solvent in an expansion chamber where it is continuously or periodically removed from the unit. One or more means for fluid flow can be used to circulate the fluid through the extraction chambers and the expansion chamber, where the expansion chamber and a condenser or the output of the means for fluid flow are coupled as a heat exchanger.

13 Claims, 10 Drawing Sheets

EXTRACTOR AND CONCENTRATOR

CROSS-REFERENCE TO RELATED APPLICATIONS

This application is a continuation-in-part of co-pending U.S. application Ser. No. 13/840,546, filed Mar. 15, 2013, now U.S. Pat. No. 9,242,189, issued Jan. 26, 2016, which claims the benefit of U.S. Provisional Application Ser. No. 61/736,211, filed Dec. 12, 2012, the disclosures of which are hereby incorporated by reference in their entireties, including all figures, tables and drawings.

BACKGROUND OF THE INVENTION

The extraction process has been used for centuries for the isolation of desirable materials. The process involves the mixing of a solvent with extractable material, separation of the solution that is formed, and removal of the solvent from the solute, a desired material.

U.S. Pat. No. 5,512,285, to Wilde, teaches a batch process for extraction of organic components from plant material. The process uses tetrafluoroethane as the extraction solvent. The process allows extraction of some desired components at near ambient temperatures, and is economical relative to super critical $CO_2$ extractions at high pressure. The system uses a tumbler to mix solvent and plant material in a sealed extractor, which is connected to an evaporator that is warmed in an immersion bath with a heater. The evaporator is connected to a compressor to effectively remove and retain the majority of the expensive solvent and return it to the extractor, if needed. The evaporator was the receiver for the extract, which when the evaporator dropped in pressure to zero prig the evaporator was opened and the extract drained from the evaporator. The evaporator is then connected to the compressor and heated to recover virtually all the solvent.

Hence, a flexible system permitting extraction that retains solvent nearly quantitatively, is cost effective, energy efficient, and can permit an effectively continuous operation is desirable.

BRIEF SUMMARY OF THE INVENTION

A continuous unit for the extraction of a desired product from plant or other extractable material is presented that allows the isolation of the product in a concentrated form, the recycling of the extraction solvent, and the drying of the extracted plant material while all are fully contained within the unit. The isolated extract is continuously removed from the unit. The unit employs a plurality of extraction chambers such that one extraction chamber is removed and replaced without halting the extraction process in other extraction chambers.

DETAILED DESCRIPTION OF THE INVENTION

Figure 1:
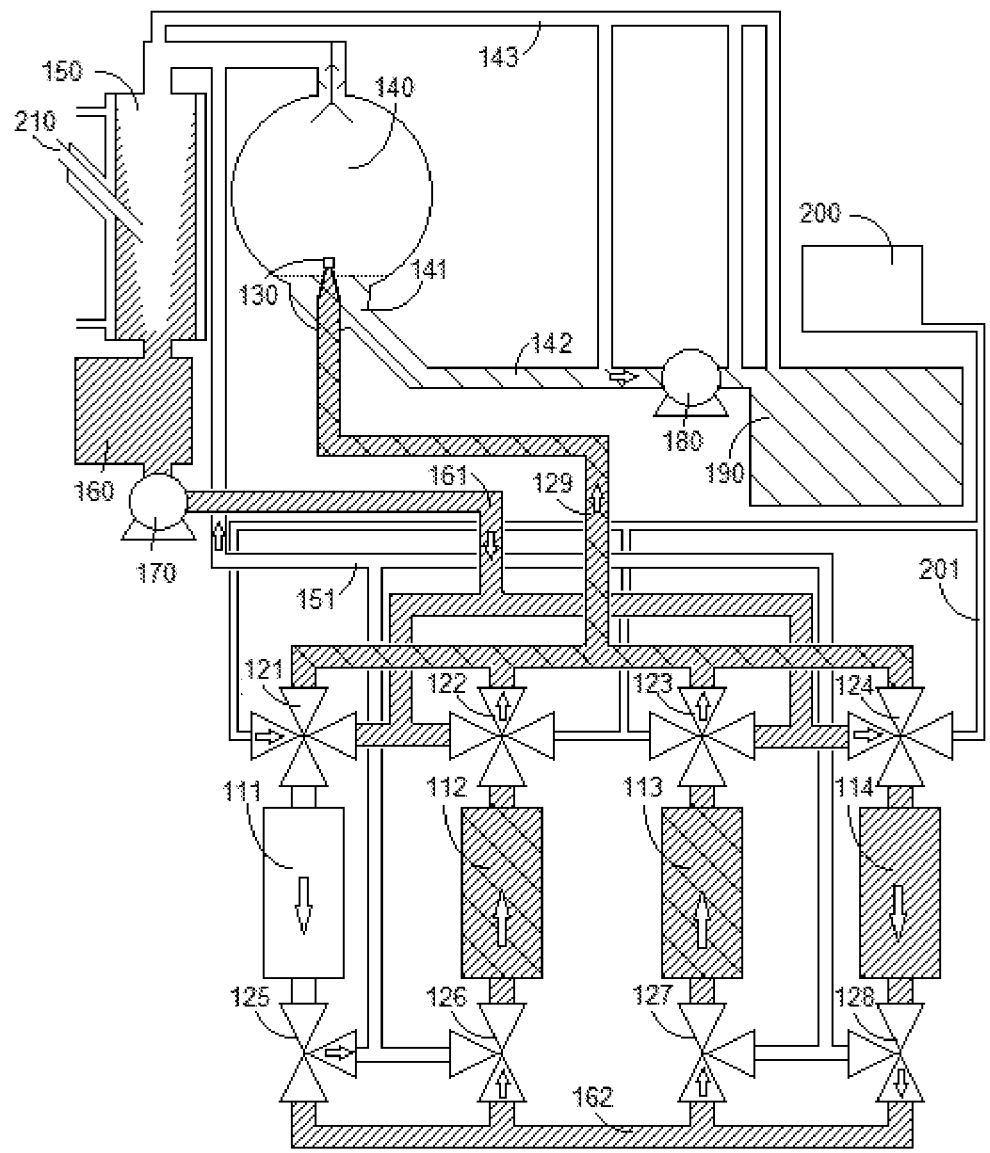
FIG. 1 shows a schematic drawing of a continuous extraction system particularly suited for extraction solvents that are liquids at STP and employs a vacuum separation chamber, according to an embodiment of the invention.

Embodiments of the invention are directed to a continuous immersion extraction system. The extraction system consists of a unit comprising a plurality of extraction chambers that are individually addressed. The extractable material can be plant material or any other extractable material that, generally, can be handled as a solid. Sludge or liquid can be adapted for use in the continuous immersion extraction system. Throughout this disclosure, the extractable material is referenced to as plant material, but it is to be understood that other extractable material can be employed. The extraction system employs a separation chamber, which is an expansion chamber, where a solvent from a solution is vaporized, with the formation of an aerosol from one or more solutes that consolidate into an extract. The extraction chambers are independently: in a state of having plant material being extracted by a solvent, wherein the desired extract is a solute of a solution that is formed; in a state of being washed of residual solute and solution residing in the vicinity of the extracted material; in a state of removal of residual solvent, such that the extracted (spent) plant material can be prepared for removal from the unit; or in a state of being removed from the unit and replaced with an equivalent extraction chamber containing fresh plant material for extraction. The extraction system retains nearly all solvent within the system without losses of solvent to the environment. The extraction system allows the continuous removal of the extract from the system. The extraction process is carried out in a manner where energy consumption is minimized, spent plant material is easily and safely disposed of as waste or employed as a useful by-product, and all other material is recycled solvent or the desired extract. The system can be constructed to couple heat absorbing and heat releasing portions of the system as a heat exchanger, which minimizes energy consumption.

The extraction system can be employed in a batch manner by employing a single extraction chamber, although, in that manner, the extraction system does not simultaneously extract and dry spent extracted material. Nevertheless, as other features of the system allow for significant savings in energy input, for example, the ability to couple heat release and heat absorption inherent to the system, one may employ a single extraction chamber as desired and retain the energy savings. For example, when the available extractable material is in insufficient quantity to efficiently employ a plurality of extraction chambers, use in a batch mode can be desired. Alternatively, one may insert extraction chambers that contain extractable material and filled with solvent prior to inclusion into the system and remove the extraction chamber with extracted material while retaining solvent to permit a processing on the extractable material prior to extraction and/or a subsequent processing of the extracted material in a process that employs the extraction solvent and the extraction chamber. In this manner the process remains continuous without the continuous retention of all solvent within the system but by continuously adding and removing equal amounts of the solvents to the system.

In an embodiment of the invention, as illustrated, but not limited by, FIG. 1, a plurality of equivalent extraction chambers 111, 112, 113, and 114 contain plant material, where all but one of the extraction chambers 112, 113, and 114 experiences flow of an extraction solvent. The remaining extraction chamber 111 is in a state of being prepared for exchange or being exchanged with an equivalent extraction chamber containing fresh plant material. The extraction solvent is retained within the system and the desired extract is continually removed from the system as a neat or highly concentrated form. In embodiments of the invention, the extract solution flows through at least one nozzle 130 into a low-pressure separation chamber 140 where the extraction solvent is separated as a volatile from the solute comprising the desired extract. At least one filter resides at the exit of each extraction chamber 111, 112, 113, and 114 and/or the conduit 129 connecting the extraction chamber to the nozzle 130 and separation chamber 140 such that the plant material does not exit the extraction chambers 111, 112, 113, and 114 or fines that can clog a nozzle 130 are not discharged into the system. The separation chamber 140 has a port 141 through which the extract, the solute of the extraction solution, is removed from the system in a continuous manner, optionally, by use of a pump 180. Optionally, depending on the pressure and solvent volatility, the separation chamber and/or the piping preceding the nozzle 130 can include a means for heating.

The separation chamber 140 is maintained at a lower pressure than that of the extraction chambers and can be, but is not necessarily, under vacuum, as illustrated in FIG. 1. The separation chamber 140 promotes solvent vaporization to separate the solvent from the extract as a neat solute or a highly concentrated solution. The extract flows under the influence of gravity and collects at port 141 where removal from the extractor system is carried out in a continuous manner using a pump 180, or where a reservoir 190 is filled by gravity induced flow, without pump 180. When a highly concentrated solution is removed, most, if not all, of the remaining solvent can be recovered and returned to the extraction system through an optional conduit 143 that is connected to: reservoir 190; a conduit between the pump 180 and the reservoir 190; and/or within a conduit 142 between the port 141 and the pump 180.

The extraction solvent vaporized in the separation chamber is reverted to the condensed phase using a condenser 150 for reintroduction of the extraction solvent into the extraction chambers for further extraction of plant material. Fluid is transmitted through the system by a positive displacement pump 170. The low pressure of the separation chamber 140 can be maintained by a vacuum pump connected at a port 210 to a condenser 150 where the vaporized solvent is condensed before the inlet side of the positive displacement pump 170. Optionally, a solvent reservoir 160 is situated between the condenser 150 and the pump 170 inlet.

In an embodiment of the invention, the system includes a multiplicity of extraction chambers 111, 112, 113, and 114 that have valves or combinations of valves situated at the solution exit of the extraction chambers, 121, 122, 123, and 124, and valves or combinations of valves at the opposite end of the chambers, 125, 126, 127, and 128. As illustrated in FIG. 1, for example, solvent from solvent reservoir 160 is pumped through conduit 161 and directed through valve 124 into extraction chamber 114. Extraction chamber 114 contains plant material from which a large proportion of the extract solute has been removed, which results in a rapidly decreasing concentration of extract in the solution and ultimately solvent flowing from extraction chamber 114 through valve 128 into conduit 162. Although FIG. 1 shows fluid flow from the top to the bottom of extraction chamber 114, it should be understood that the system is easily plumbed to cause that flow to be from the bottom to the top of extraction chamber 114. From conduit 162, the dilute solution or solvent, is directed into extraction chambers 112 and 113 through valves 126 and 127, respectively. The flow rate in extraction chamber 114 is approximately double that experienced individually in extraction chambers 112 and 113, as illustrated in FIG. 1. The relative flow rate depends on the number of extraction chambers in the state illustrated for extraction chamber 114 versus the number of extraction chamber in the state illustrated for extraction chamber 113, and generally, a system running at its highest efficiency will have significantly more in the state of extraction chamber 113. Upon exit of the concentrated solution from extraction chambers 112 and 113 through valves 122 and 123, respectively, flow is directed through conduit 129 to the nozzle 130 within the separation chamber 140. While the fluid flow has been directed, as indicated, through extraction chambers 114, 112, and 113, extraction chamber 111, which contains completely extracted plant material, is in a state of being prepared for replacement with an equivalent extraction chamber. FIG. 1 illustrates one manner in which this exchange preparation can be carried out by aligning valves 121, as shown, and 125, contrary to what is shown, to admit a gas, for example, nitrogen, to force the solvent into conduit 151. When all solvent, except that wetting residual plant material, has been removed from extraction chamber 111, valve 125, as shown, is aligned to direct nitrogen and solvent vapor to conduit 151, which directs the solvent vapors to condenser 150, allowing the spent extracted material to be dried before removal from the unit. Valve 121 can be aligned as indicated or may be partially or completely shut off when the pressure drops in extraction chamber 111, which also promotes drying of the spent plant material therein.

Upon removal of all, or nearly all, solvent from extraction chamber 111, it is isolated from the system by closing valves 121 and 125, and removed from the system. Subsequently, an equivalent freshly loaded recycled extraction chamber 111 is placed in the system and has its valves aligned as are the valves of extraction chambers 112 and 113. Eventually, the more extract depleted extraction chamber, either 112 or 113, has its valves, either 122 and 126 or 123 and 127, aligned for fluid flow from solvent conduit 161 to 162. Extraction chamber 114 is aligned using valves 124 and 128 to be in communication with gas line 201 from a gas source 200, for example, an inert gas, such as nitrogen; in the manner that extraction chamber 111 was previously aligned before exchange. In this manner, as shown in FIG. 1, at least one extraction chamber delivers solvent or a dilute solution to all but one of the other extraction chambers in the system and the remaining extraction chamber is being dried for replacement. Alternatively, solvent conduit 161 can be directly connected to solvent conduit 162, not shown, and all extraction chambers not in a state of drying, can be in a state of extraction, as shown for extraction chambers 112 and 113, in FIG. 1. Conveniently and efficiently, at least one additional extraction chamber can be outside of the system being emptied of extracted material and reloaded with fresh extractable material for introduction into the system. Although four extraction chambers are illustrated in FIG. 1, the system can employ 3, 5, 6, 7, 8, 9, 10 or more extraction chambers, where the majority are in the state shown for extraction chambers 112 and 113, at least one can be in the state of extraction chamber 114, and at least one is in the state of extraction chamber 111.

In addition to those components illustrated in FIG. 1, in embodiments of the invention, as desired, connectors, for example, quick release connectors, can be included within the system. Additionally, as desired, filters, heaters, chillers, heat exchangers, sampling ports, solvent input ports, level indicators, shutoff valves, isolation valves, flow meters, temperature gauges, and sensors for fluid analysis can be included in the system. In addition to the redundancy of extraction chambers, a redundancy of conduits, filters, liquid pumps, receivers, separation chambers, condensers, and vacuum pumps can be included in the system, as is readily appreciated by those skilled in the art. The system can be automated by interfacing fluid sensors, level indicators, valves, pumps, heaters and chillers to a computer programmed with technician inputted parameters for control of the system. The extraction plant can employ a plurality of these systems, where, for example, a common solvent receiver, gas source, vacuum source, and product receiver may be shared, as desired, between the plurality of systems. It is envisioned that the extraction chambers are of a size that can be readily removed and replaced by one or more technicians, as needed, without or with the aid of equipment such as forklifts, jacks and/or other mechanical equipment, as can be appreciated by those skilled in the art. All conduits, filters, gauges, pumps, or other components can be plumbed to permit their emptying and evacuation for exchange without stopping the continuous extraction system. For example, a pair of filters can be plumbed in parallel with valves that permit isolating a clogged filter, draining the filter into the system, evacuating the filter, and replacing the filter while the system is processing extract. The temperature at which the solvent is introduced into the extraction chambers can be controlled by employing a heater, chiller, or other heat exchanger in the solvent reservoir or the conduits situated prior to flow into the extraction chambers. The extraction chambers can be jacketed and can have a heating or cooling fluid circulated through the jacket.

Solvents that can be used in a system as illustrated in FIG. 1, include water, alcohols, hydrocarbons, ethers, fluorinated or other halogenated hydrocarbons, esters, amines, carboxylic acids or any other solvents that are readily vaporized at temperatures of about 25° C. to about 250° C. at pressures from about 760 mm Hg to about 1 mm Hg. Portions or all of the extraction system can be maintained at a temperature greater than room temperature throughout the system. For example, the extraction chambers, conduits, and expansion chambers can be maintained at temperatures in excess of 100° C., as desired. With respect to temperatures, a low temperature is relative to the higher temperature in the system, and a high temperature is relative to the lower temperature of the system. With respect to pressures, a high pressure is relative to the lower pressure in the system and a low pressure is relative to the higher pressure in the system. For example, a low pressure can be significantly greater than atmospheric pressure, yet still lower than the high pressure of the system. For example, a high pressure can be lower than atmospheric pressure, yet still higher than the low pressure of the system. The solvents that can be used include, but are not limited to, acetaldehyde, diethyl ether, pentane, ethyl bromide, methylene chloride, carbon disulfide, cyclopentane, acetone, methyl acetate, chloroform, methanol, tetrahydrofuran, hexane, carbon tetrachloride, ethyl acetate, ethanol, benzene, cyclohexane, propanol, ethylene dichloride, heptane, dioxane, water, formic acid, toluene, butanol, octane, ethylene bromide, acetic acid, chlorobenzene, propionic acid, xylene, nonane, bromobenzene, turpentine, furfurol, butyric acid, dimethyl formamide, dimethyl acetamide, dimethyl sulfoxide, decane, phenol, aniline, propylene glycol, ethylene glycol, acetonitrile, pyridine, or any other solvent. Depending on the solvent employed, the unit can be constructed out of metal, glass, ceramic, or plastic. Depending on the use of the extract produced, the solvent should be carefully considered for the effect of any trace amounts of solvent in the extract to consider the appropriateness of its use. Mixtures of solvents may be employed, for example, a mixture of solvents with similar volatilities or in a composition where they form an azeotrope.

Figure 2:
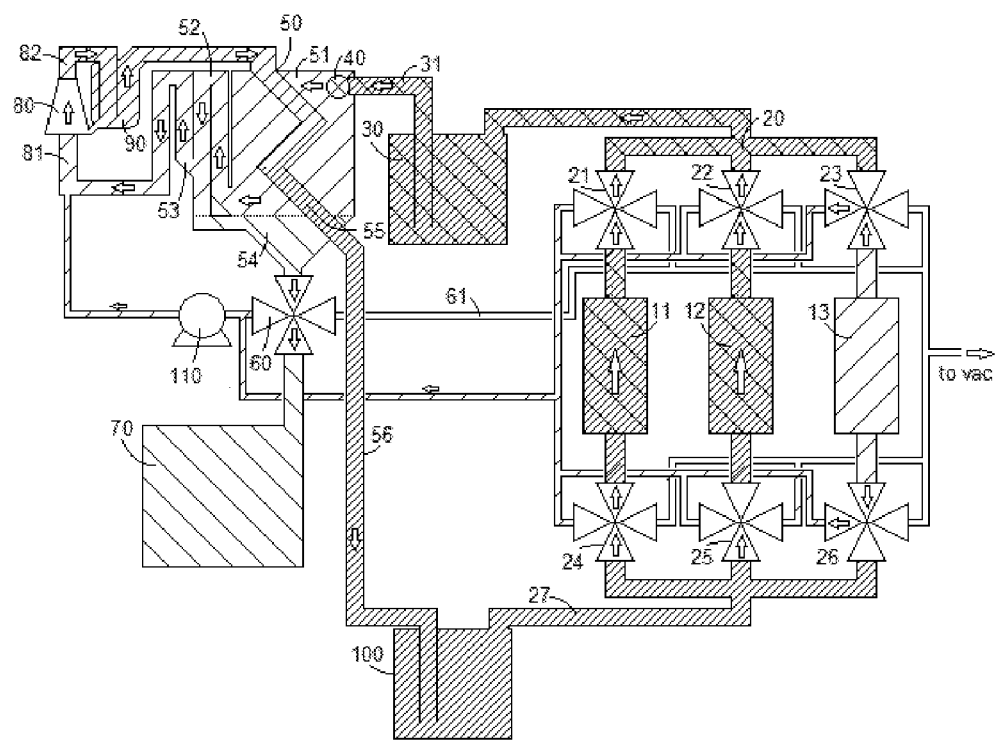
FIG. 2 shows a schematic drawing of a continuous extraction system particularly suited for extraction solvents that are gases at STP and employs pressures in excess of ambient atmospheric pressure, according to an embodiment of the invention.

In another embodiment of the invention, the continuous extraction system is designed to employ solvents that are gases at typical room temperatures at one atmosphere, such as, but not limited to, fluorocarbons, where all extraction and separation portions of the system are carried out at pressures above ambient atmospheric pressure. As shown in FIG. 2, liquid solvent under high pressure transports from a first, optional, receiver 100 via conduit 27 through valves 24 and 25 into extraction chambers 11 and 12 that contain plant material. Valves 21 and 22 are aligned to direct liquid solution to conduit 20 to a second, optional, receiver 30. Typically, although not shown, at least one filter is present at exits to all extraction chambers 11, 12 and 13, and/or in conduits 20 and/or 31. Although, one or both of the receivers can be used to compensate for fluctuations in the volume of liquid contained in the extraction chambers, in principle, the system can function without a reservoir. High-pressure liquid solution from receiver 30 flows to thermal expansion valve 40 and into a low-pressure expansion chamber 51 of heat exchanger 50, where the solution disproportions into a solvent vapor and, typically, an aerosol of the extract with the absorption of heat. The aerosol impinges on the internal surfaces of the low-pressure expansion chamber 51, coalesces and drains to a collection port 54, at a low portion of the low-pressure expansion chamber 51. The low-pressure solvent vapor travels through the low-pressure side of the heat exchanger through traps 52 and, optionally, 53, which, although shown in FIG. 2 with a serial geometry, a plurality of traps may be in parallel or may be baffles within the expansion chamber 51. All trapped extract drains to the collection port 54 where it flows through valve 60 to extract receiver 70. The low-pressure vapor solvent flows through low pressure conduit 81 to the inlet of compressor 80, where the low-pressure vapor solvent is compressed to high-pressure vapor solvent. The high-pressure vapor flows through an optional oil trap 90, when a compressor that employs oil is used. The oil used at the compressor 80 can be the extract to avoid contamination by a lubricant. The high-pressure vapor transports through conduit 82 into the high-pressure side of heat exchanger 50, which is condenser 55. Heat is released from the high-pressure vapor in the condenser 55 to the low-pressure expansion chamber 51 resulting in the condensation of the high-pressure solvent vapor to liquid solvent in the condenser 55 of the heat exchanger 50. The liquid solvent exits the condenser 55 where the liquid solvent flows through conduit 56 and to the solvent receiver 100, from which the extraction chambers 11, 12, and 13 are filled with solvent.

The system is configured to employ a plurality of extraction chambers, illustrated with three extraction chambers 11, 12, and 13 in FIG. 2, where at least one of the extraction chambers, illustrated with extraction chambers 11 and 12 in a state of extraction by the positioning of valves 21, 22, 24, and 25 to transmit liquid solvent from receiver 100 through conduit 27 and into and ultimately through extraction chambers 11 and 12. The remaining extraction chambers, illustrated in FIG. 2 by the single extraction chamber 13, where valves 23 and 26 are aligned to vaporize to solvent and force the vapor solvent into the low pressure conduit 81. Upon reducing the pressure in extraction chamber 13 to the low pressure of the system, if pump 110 cannot pump the extraction chamber 13 to atmospheric pressure or below, valves 23 and 26 can be aligned to vent to normal atmospheric or to vacuum in a manner to collect the last residual solvent from the extracted plant material before removing extraction chamber 13. Extraction chamber 13 is replaced with a recycle extraction chamber containing fresh plant material. Upon introducing the replacement extraction chamber 13, valves 23 and 26 are aligned to remove air via a vacuum source before opening replacement extraction chamber 13 into the system.

The extract drained from the traps 52 and 53 and expansion chamber 51 into the collection port 54 of the heat exchanger 50 is drained, or otherwise transported, to extract receiver 70 through valve 60. When the extract in the receiver 70 contains solvent, valve 60 can be aligned to vent solvent vapor through pump 110 to the low-pressure conduit 81. Subsequently, valve 60 can be aligned to remove final traces of solvent through conduit 61 to a vacuum source for collection.

In addition to those components illustrated in FIG. 2, in embodiments of the invention, as desired, connectors, for example, quick release connectors can be included within the system. Additionally, as desired, filters, heaters, chillers, additional heat exchangers, sampling ports, solvent input ports, level indicators, shutoff valves, isolation valves, flow meters, and sensors for fluid analysis can be included in the system. In addition to the redundancy of extraction chambers, a redundancy of conduits, liquid pumps, receivers, separation chambers, condensers, and vacuum pumps can be included in the system, as is readily appreciated by those skilled in the art. The system can be automated by interfacing fluid sensors, level indicators, valves, pumps, heaters and chillers to a computer with programmed of technician inputted parameters for control of the system. The extraction process can employ one or more systems, where, for example, a common solvent receiver, gas source, vacuum source, and product receiver may be shared, as desired, between a plurality of units. It is envisioned that the extraction chambers are of a size that can be readily removed and replaced by one or more technicians, as needed, without or with the aid of equipment such as forklifts, jacks and/or other mechanical equipment, as can be appreciated by those skilled in the art.

Solvents that can be used are freons, for example, but not limited to, are trifluoromethane, difluoromethane, fluoromethane, pentafluoroethane, pentafluorodimethyl ether, 1,1,2,2-tetrafluoroethane, 1,1,1,2-tetrafluoroethane, Bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, 1,1,2,2,3-pentafluoropropane, pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, 1,1,3-trifluoropropane, 1,1,1,3,3-pentafluorobutane, 1,3-difluoropropane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,3-trifluoropropane, 1,3-difluoropropane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,2,2,3-pentafluoropropane, 1,1,1,3,3-pentafluoropropane, 1,1,3-trifluoropropane, 1,1,3-trifluoropropane, 1,3-difluoropropane, 2-(difluoromethyl)-1,1,1,2,3,3-hexafluoropropane, 1,1,2,2,3,3,4,4-octafluorobutane, 1,1,1,2,2,4-hexafluorobutane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1,2,3,3,4-octafluoro-2-(trifluoromethyl)butane, 1,1,1,2,2,3,3,4,4,5,5- undecafluoropentane, 1,1,1,2,2,3,4,5,5,5-decafluoropentane, 1,1,1,2,2,3,3,5,5,5-decafluoropentane, 1,1,1,4,4,4-hexafluoro-2-(trifluoromethyl)butane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 1, 1, 1, 2, 2, 3,3,4,4,5,5,6,6-tridecafluorohexane, 1,1,1,2,2,5,5,5-octafluoro-4-(trifluoromethyl)pentane, 1,1,2,2-tetrafluorocyclobutane, 3,3,4,4,5,5,6,6,6-nonafluoro-1-hexene, 1,1,1-trifluoroethane, pentafluoroethane, or any mixture thereof. In other embodiments of the invention, the solvent can be a non-freon, such as methyl ether, butane, propane, ammonia, or sulfur dioxide.

The compressor can be of any design and can be one that requires oil or is oil-free. If oil is employed in the compressor, the oil can be of any type, including, but not limited to, hydrocarbon, fluorocarbon or silicone oil.

The system can be used with pressures that are higher than normal air pressure, 14.7 psi. For example, the low-pressure side of the compressor may be 20 to 50 psi and the high-pressure side of the compressor may be 50 to 200 psi. Materials of construction for the extraction unit are those, which may contain pressures in excess of the highest pressure of the system. For example, metal or metal alloys are useful materials of construction, although other materials may be used when they are capable of withstanding the high pressures of the system.

Figure 3:
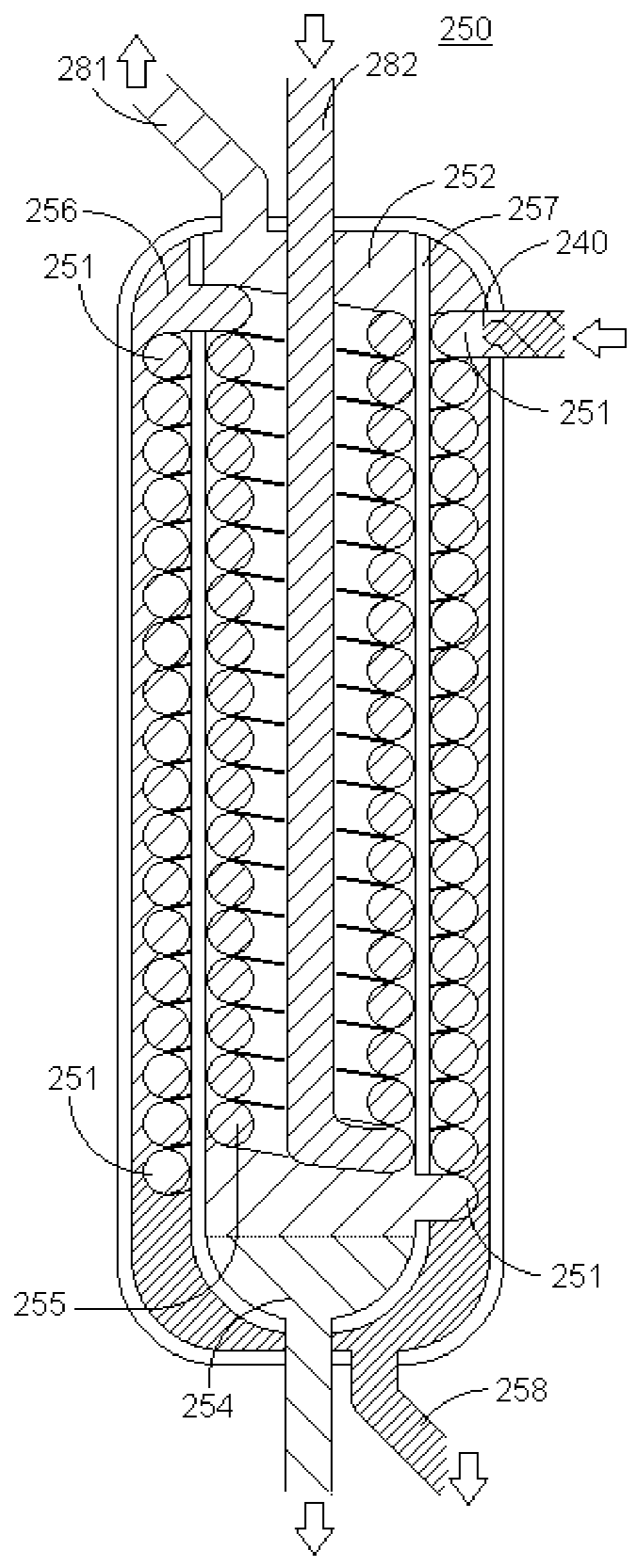
FIG. 3 shows a cross-section of a heat exchanger that combines the separation chamber and the condenser of the continuous extraction system, according to an embodiment of the invention.

Although many different designs may be used, the cross-section of a heat exchanger 250 is shown in FIG. 3. In this heat exchanger 250, hot high pressure vapor enters the top of the heat exchanger 250 from conduit 282 and circulates through a coiled first portion of condenser 255 from the bottom of a trap 252 where the coils intimately contact the inside of a heat sink 257. Heat sink 257 transfers the heat from this coiled first portion of condenser 255 to the lower-pressure coiled expansion chamber 251 on the outside of cylindrical heat sink 257. The thermal expansion valve 240 delivers an aerosol from the solution formed in extraction chambers to the lower-pressure coiled expansion chamber 251 where vaporization of the solvent occurs with the absorption of heat from the heat sink 257. The heat sink 257 is heated by the hot and condensing high-pressure vapor, which, after rising through the first portion of condenser 255, enters a second portion of the condenser 256, where the high-pressure solvent vapor and/or liquid solvent flows over the lower-pressure coiled expansion chamber 251. Any high-pressure solvent vapor completely condenses in this second portion of the condenser 256 and flows into the exit conduit 258, as shown in FIG. 3. Alternatively, as needed, cooled high-pressure solvent vapor from the second portion of the condenser 256 can lead to an additional third portion of the condenser, not shown, where additional cooling is provided to condense the solvent vapor into liquid solvent. The fluid extract drains to a collection port 254 and the solvent vapor rises through the trap 252 chamber around the first portion of condenser 255 exiting into the low pressure solvent vapor conduit 281 that ultimately leads to a compressor.

Figure 4:
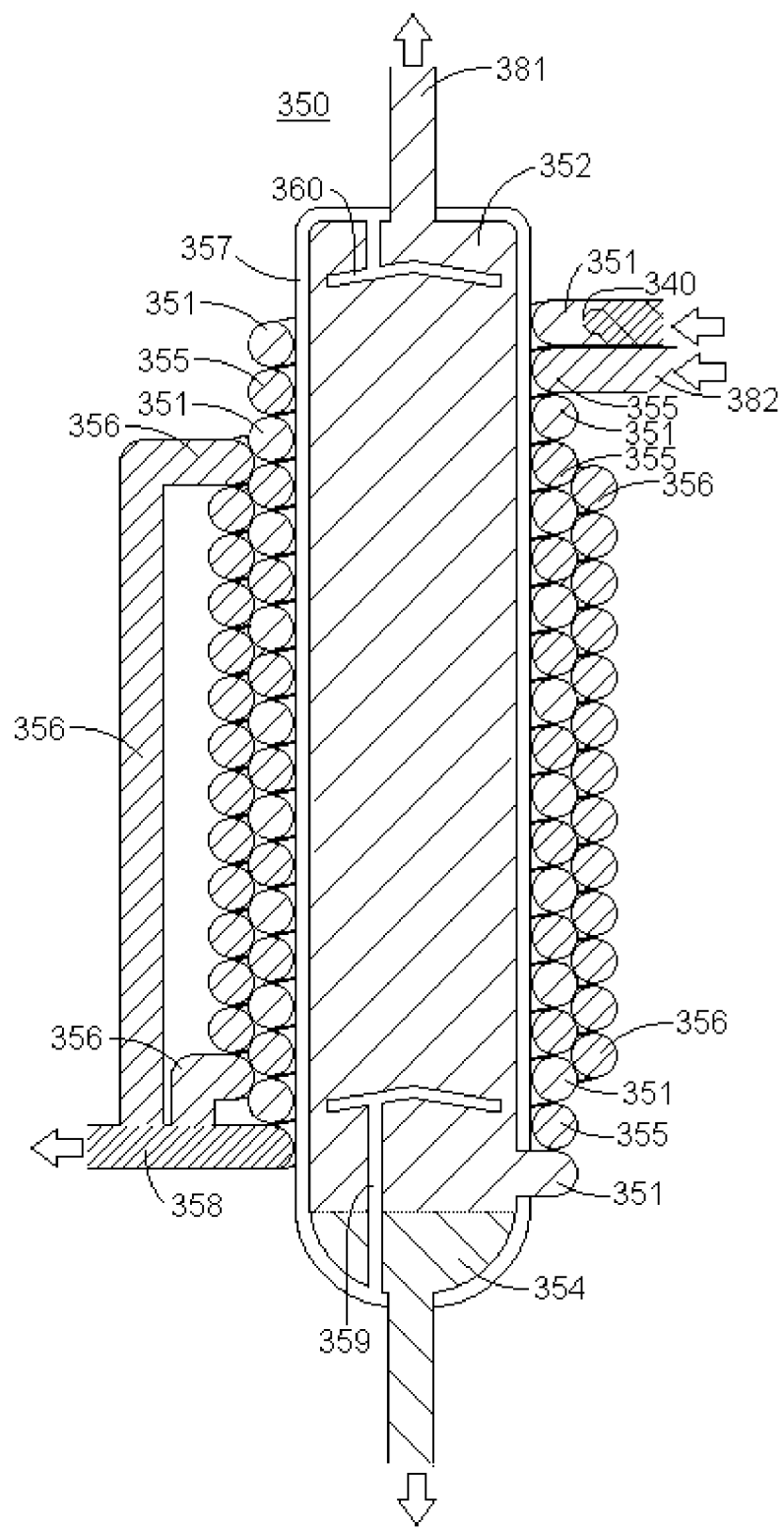
FIG. 4 shows a cross-section of a heat exchanger that combines the separation chamber and the condenser of the continuous extraction system, according to an embodiment of the invention.

Another heat exchanger 350 that can be used, in a continuous extraction system according to an embodiment of the invention, is shown in FIG. 4. In this heat exchanger 350, hot high-pressure vapor enters the top of the coiled condenser 355 of the heat exchanger 350 from conduit 382. The coiled condenser 355 spirals from the top of the heat exchanger 350 in intimate contact with a heat sink 357 and coiled expansion chamber 351, where the coiled condenser 355 and coiled expansion chamber 351 alternate as they proceed downward along heat sink 357. The thermal expansion valve 340 delivers an extract solution into the coiled expansion chamber 351 where vaporization of the solvent of the solution occurs with the absorption of heat from the contacting coiled condenser 355 and the heat sink 357. The high-pressure solvent vapor condenses in this coiled condenser 355 and flows into the exit conduit 358, as shown in FIG. 4. Any equilibrium high-pressure solvent vapor can enter an exterior coiled second portion of the condenser 356 where the solvent vapor is further cooled by the external environment or, as desired, by a second cooling source to assure condensing of the solvent vapor into liquid solvent. The fluid extract drains to a collection port 354 and the low pressure solvent vapor rises through the trap 352 chamber around the heat sink 357 exiting into the low pressure solvent vapor conduit 381 that ultimately leads to the compressor. To assure that extract is not entrained as an aerosol to the compressor; baffles 359 and 360 are constructed, but are not necessarily required, near the entrance and exit of the low-pressure vapor into trap 352.

Figure 5:
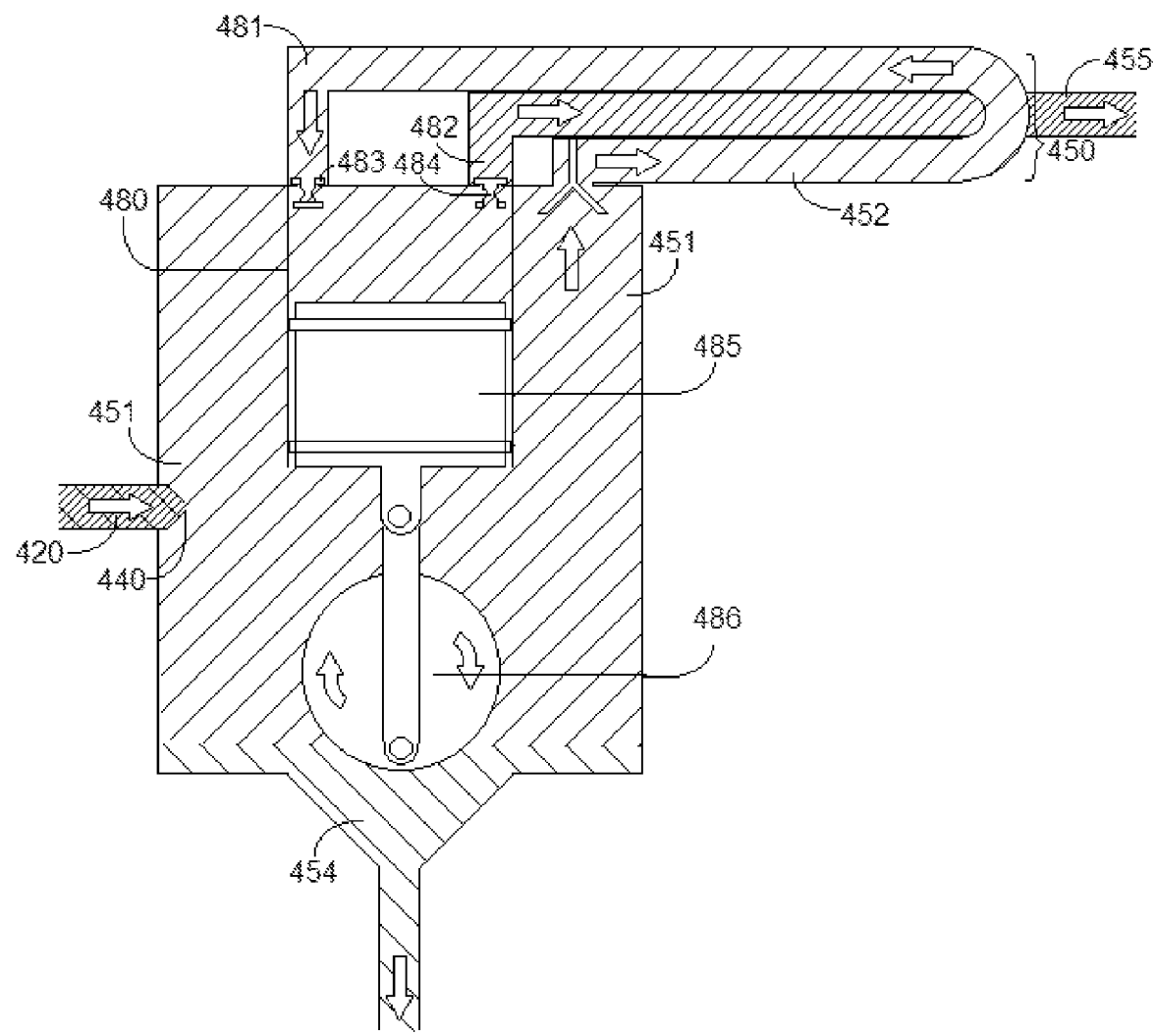
FIG. 5 shows a cross-section of a heat exchanger combined with a compressor where the crankcase of the compressor is included as a first portion of the separation chamber of the heat exchanger of the continuous extraction system, according to an embodiment of the invention.

As shown in FIG. 5, the compressor 480 can be combined with the heat exchanger 450, which permits the cooling of the compressor 480 in addition to cooling the hot high-pressure solvent vapor. Although the illustrated compressor is a piston driven reciprocating compressor, many types of compressors can be used, including, but not limited to, rotary vane, diaphragm, scroll, and roots compressors. An oil-free compressor can be used or a compressor that requires a lubricant can be used. A conduit 420 delivers the extract solution from extraction chambers to the expansion valve 440 to the crankcase of the compressor, which constitutes a first portion of the expansion chamber 451, where the extract separates from the low-pressure solvent vapor and the extract drains to the collection port 454 at the base of the compressor. As shown in FIG. 5, the extract also functions as the lubricant for the crankshaft 486 of compressor 480, where the cooling by the expanding solvent vapor in the expansion chamber 451 keeps the temperature below the thermal decomposition temperatures of the extract. The low-pressure vapor then enters a second portion of the expansion chamber 452, where the fluid is in a conduit that contacts the condenser 482 of the heat exchanger 450 after the high-pressure solvent vapor exits the compressor 480 when forced through an exit check valve 484 upon the up-stroke of piston 485. Although FIG. 5 shows heat exchanger 450 as straight, touching conduits of the expansion chamber 452 and the condenser 482, the heat exchange of this geometry is not required. As the warm high-pressure solvent vapor proceeds through the condenser 482 it condenses and exits the heat exchanger 450 as a liquid solvent in an exit conduit 455. Heat is exchanged to the cool low-pressure solvent vapor in the second portion of the expansion chamber 452 in heat exchanger 450 where it is drawn through the entrance conduit 481 though the entrance check valve 483 on the down-stroke of piston 485 of compressor 480.

Figures 6A, 6B, 6C, 6D:
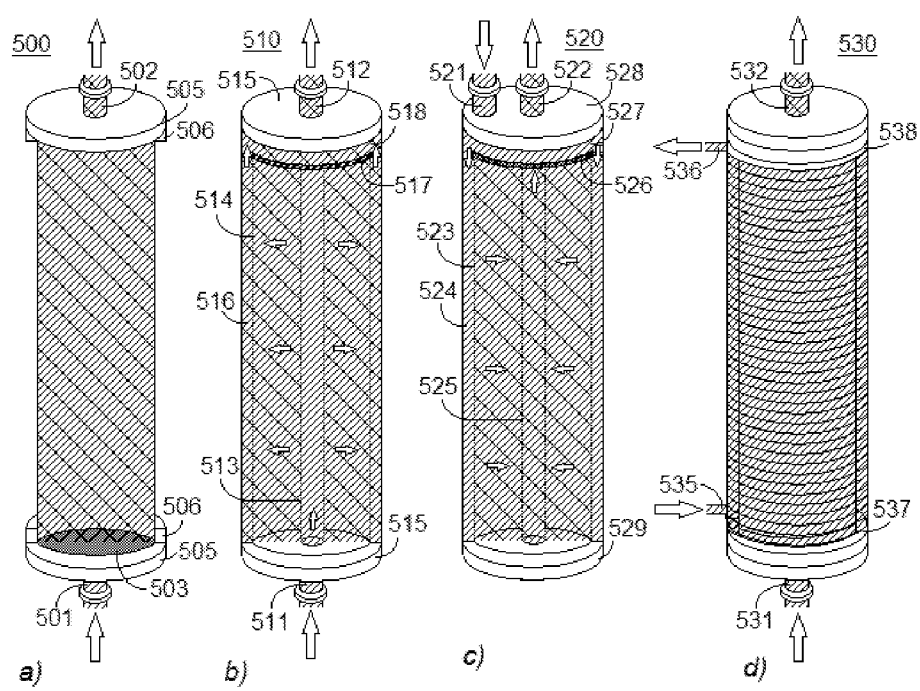
FIGS. 6A-6D shows a cross-section of FIG. 6A an extraction chamber where the extraction solvent flows from the bottom to the top of the exchanger, FIG. 6B an extraction chamber where the extraction solvent flows from the center to the periphery of the extraction chamber, FIG. 6C an extraction chamber where the extraction solvent flows from the periphery to the center of the extraction chamber, and FIG. 6D an external view of an extraction chamber with a jacket for heating or cooling of the contents of the extraction chamber for use in a continuous extraction system, according to an embodiment of the invention.

The extraction system, according to embodiments of the invention, is configured to employ a plurality of extraction chambers. FIG. 6A-D illustrates some, but not all, possible extraction chamber designs that can be included into the extraction system. FIG. 6A shows a simple cylindrical extraction chamber 500 where an inlet 501 feeds solvent through a filtering and fluid distributing screen 503. The extract solution is formed as the fluid is carried through the plant material housed in the cylindrical extraction chamber 500 and exits through a second filtering screen, not shown, which is equivalent to screen 503 at outlet 502. As can be appreciated upon consideration of FIG. 1, the fluid can be passed with a flow opposite of that illustrated in FIG. 6A. The ends of extraction chamber 500 can be fixed by coupling a capping portion 505 to an end, shown with an optional flange 506, to allow the removal of the caps 505 and the screens 503. By exposing the entire central cylinder of the extraction chamber 500, simple removal of the spent plant material is possible, leaving an empty open cylinder that can be refilled after fixing one of the caps 505 and screens 503.

FIG. 6B shows a second configuration of a extraction chamber 510, where the solvent enters through the inlet 511 and enters a porous fluid distribution tube 513 closed by an impervious disc 517 at the end of tube 513 distal to inlet 511, which forces the fluid flow radially through the plant material from the central fluid distribution tube 513. The extract solution is forced through a filtering porous inner wall 514 of a jacket 516 where the extract solution is forced to consolidate at a consolidation volume 518 before exiting the extraction chamber 510 through outlet 512. The ends of the extraction chamber 510 can employ caps 515 for ease of removing spent plant material and loading fresh plant material.

FIG. 6C shows a third configuration of an extraction chamber 520, where the solvent enters through an inlet 521, entering a fluid distribution section 527 that diverts the solvent flow by a non-porous disc 526 to a jacket 524. The solvent is forced through a porous distribution diffuser 523 on the interior of jacket 524 where the fluid flows through the plant material to a central porous filtration tube 525 where the extract solution is directed through outlet 522 that resides on the same end of the extraction chamber 520 as inlet 521. The ends of the extraction chamber 520 can employ caps 528 and 529 for ease of removing spent plant material and loading fresh plant material.

FIG. 6D illustrates an extraction chamber 530 where the solvent enters through an inlet 521 and exits through an outlet 522, which can have a fluid distribution jacket around an extraction chamber such as that shown in FIGS. 6a) through 6c) or any other design. The jacket permits the circulation of a heating or cooling fluid against the exterior of the extraction chamber 530. The heating fluid can be the liquid solvent exiting the condenser of the heat exchanger. As shown in FIG. 6D, fluid can be introduced to the jacket at an inlet 535, fill the jacket, and exit an outlet 536 at the opposing end of the jacket. Optionally, the inlet can be at the base of a ramp 537 having an incline that makes a single revolution about the jacket to the inlet ending immediately above the opening from inlet 535 to promote a circuitous flow of the fluid that spirals up the jacket. The spiral flow can be further encouraged by a similar, optional, additional ramp 538 at the outlet 536 end of the jacket. Jackets or other heating or cooling sources, in reservoirs of the solvent or extract solution, or on conduits, for example, those leading into the extraction chamber or into expansion chambers, can augment providing a heating or cooling fluid on the jackets of the extraction chambers.

Figure 7:
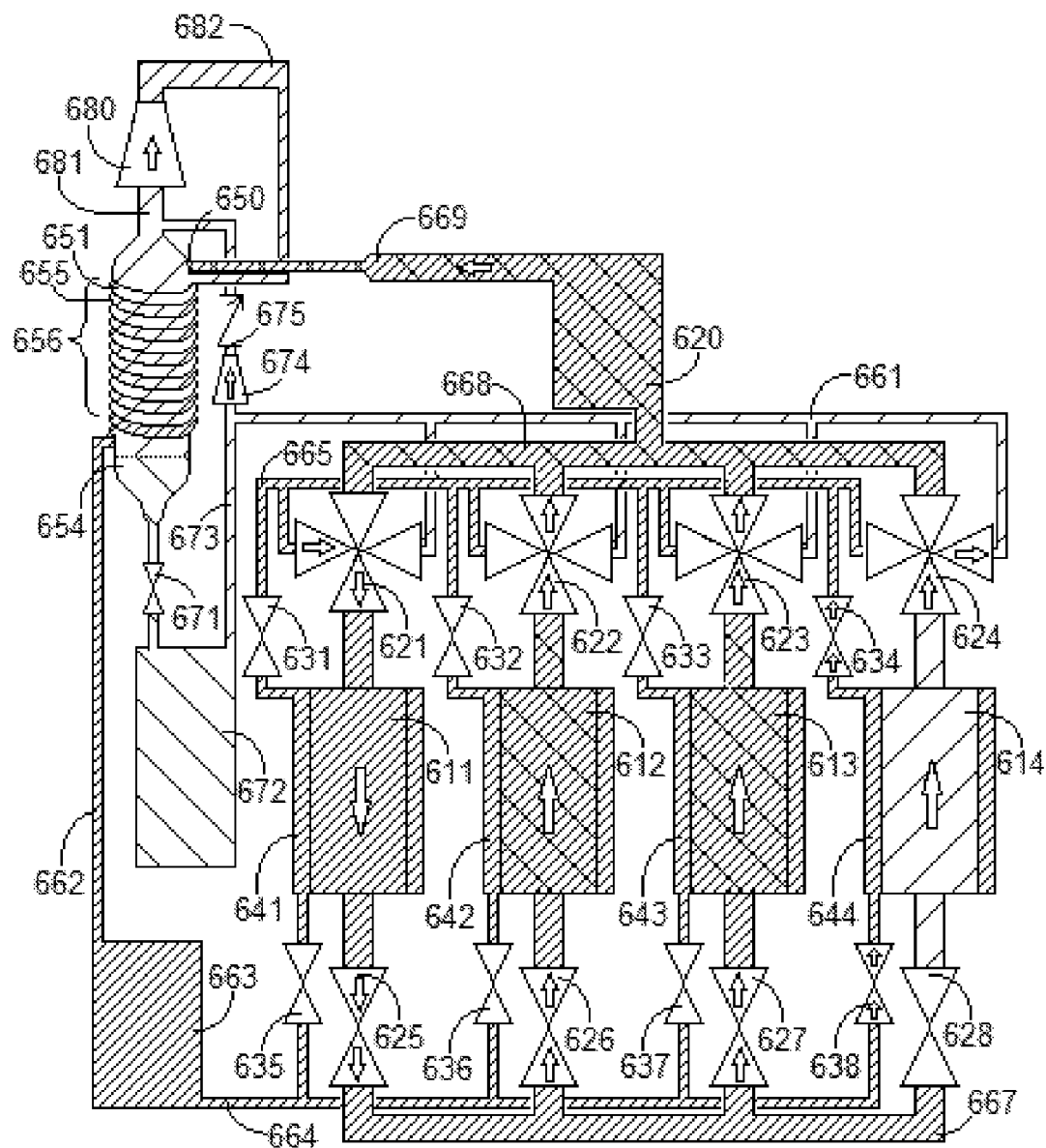
FIG. 7 shows a schematic drawing of a continuous extraction system, according to an embodiment of the invention.

In an embodiment of the invention, a continuous extraction system can be used with nearly any solvent. As illustrated in FIG. 7, the continuous extraction system comprises a multiplicity of jacketed extraction chambers 611, 612, 613, and 614. Fluid from solvent reservoir 663 is directed via conduit 664 through jacket inlet valve 638 with jacket inlet valves 635, 636, and 637, as well as jacket outlet valves 631, 632, and 633, in closed positions to isolate jackets 641, 642, and 643. The solvent exits jacket 644 through jacket outlet valve 634 into conduit 665 that delivers solvent to extraction chamber 611 through valve 621. The plant material of extraction chamber 611 is nearly spent of the extract and, as shown, experiences twice the individual fluid flow rate of extraction chambers 612 and 613. Although not necessary, this is advantageous for rapidly removing the last portions of extract on the plant material in extraction chamber 611. The very dilute extract solution exits extraction chamber 611 exits through valve 625 into conduit 667 that feeds extraction chambers 612 and 613 through valves 626 and 627. The concentrated extract solution from extraction chamber 612 and 613 flows through valves 622 and 623 into conduit 668 to extract solution reservoir 620. Extract solution reservoir 620 feeds concentrated extract solution through conduit 669 to the expansion valve 650 of expansion chamber 651 in a heat exchanger 656, which suggests, but is not necessarily, the design shown in FIG. 4 for the heat exchanger.

As illustrated in FIG. 7, the extract drains to the collection port 654 of the trap 651 of heat exchanger 656 and drains through extract valve 671 into extract receiver and concentrator 672. Extract valve 671 is periodically opened or is continuously open to a degree that a column of extract resides in the collection port 654 at the inlet of valve 671 throughout operation of the continuous extraction system. Low-pressure solvent vapor is in equilibrium with the extract in the extract receiver and concentrator 672, which is connected via concentrator conduit 673 to concentrating and evacuating compressor 674. One or more plates or baffles can be situated in extract receiver and concentrator 672 to spread wet extract over a larger surface area and increase the rate of solvent evaporation, and/or a stirrer or other mixer can be included in the extract receiver and concentrator 672. Although not shown, a port with a valve permits the removal of extract from the extract receiver and concentrator 672. The outlet of the concentrating and evacuating compressor extract receiver and concentrator 672 is connected to a check valve 675, which forces low-pressure solvent vapor into inlet 681 of compressor 680 only when the outlet pressure of the concentrating and evacuating compressor 674 exceeds the low-pressure solvent in the extraction chamber outlet 681. This permits generation of a vacuum in the extract receiver and concentrator 672 to remove nearly all solvent from the extract. A vacuum of, for example, 20 Torr, for example, 10 Torr, for example, 5 Torr, for example, 1 Torr or less, can be achieved in the extract receiver and concentrator 672 to allow removal of the extract with almost no solvent therein.

The concentrating and evacuating compressor 674 is also connected through conduit 661 through valve 624 to extraction chamber 614. Extraction chamber 614 contains completely spent plant material, which is dried by the vacuum created by extract receiver and concentrator 672 when isolated by closing valve 628. The output high-pressure solvent vapor from compressor 680 is directed through conduit 682 to the condenser 655 portion of the heat exchanger 656 with an output of liquid solvent into conduit 662 to liquid solvent receiver 663.

Figure 8:
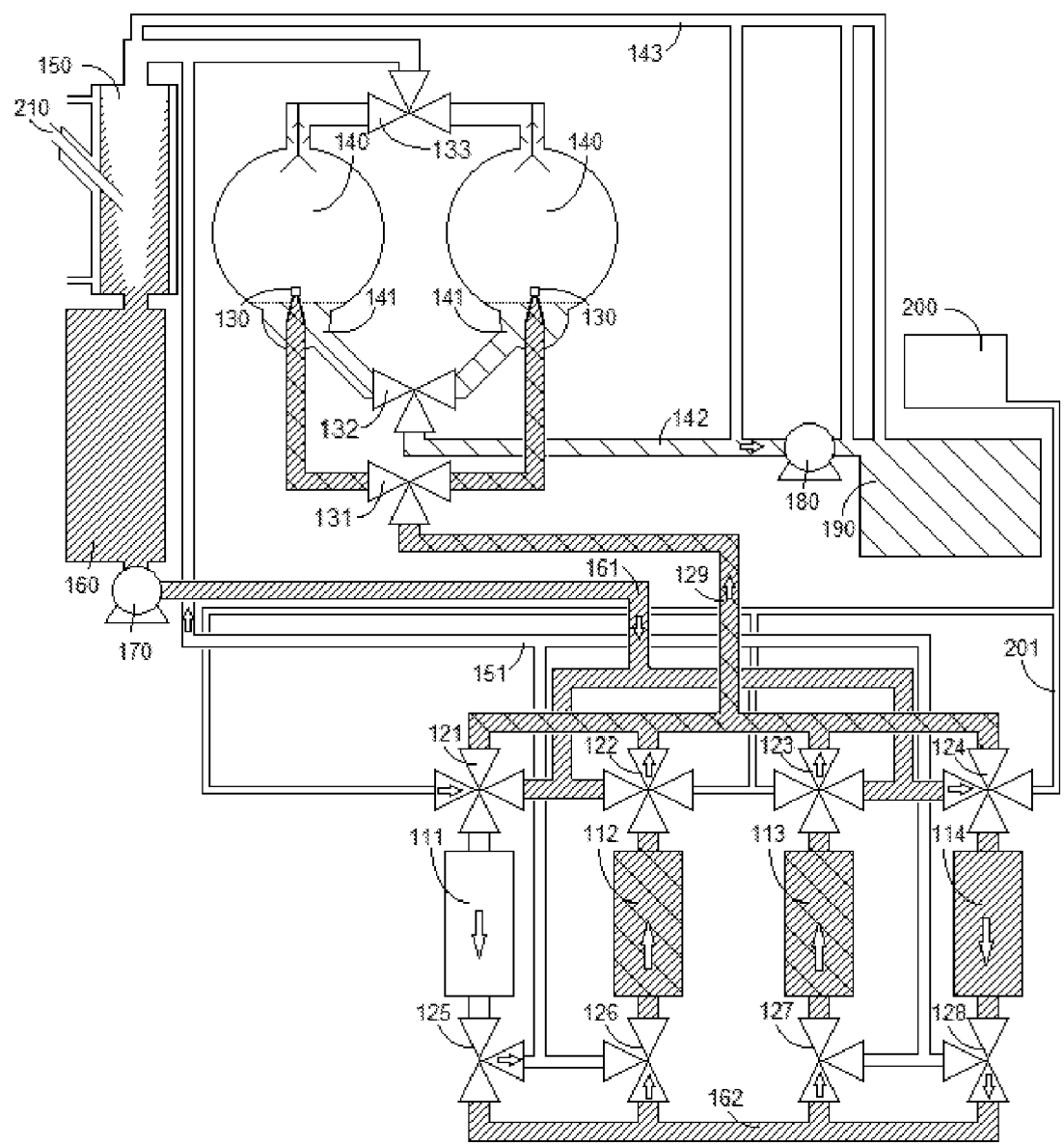
FIG. 8 shows a schematic drawing of a continuous extraction system particularly suited for extraction solvents that are liquids at STP and employs a plurality of vacuum separation chambers, according to an embodiment of the invention.

In an embodiment of the invention, the continuous extraction system, as illustrated in FIG. 1 can be modified, as illustrated in FIG. 8, to include a plurality of low-pressure separation chambers 140 including at least one nozzle 130, which functions as an expansion valve, in each of the plurality of expansion chambers 140 where the extraction solvent is separated as a volatile from the solute comprising the desired extract. The extract solution flows through at least one first selection valve 131 that is positioned to employ one or more expansion chambers 140. At least one second selection valve 133 is complementarily positioned for the selective communication of one or more of the expansion chambers 140 to a means of achieving the relatively expansion chambers 140. At least one third selection valve 132 is positioned to selectively remove a fluid extract from one or more selected expansion chambers 140 when isolated from the means of achieving the relatively low-pressure by appropriate positioning of second selection valve 133, while other of the expansion chambers 140 remain in continuous flow throughout the system. When the extract is a solid or includes a solid within a suspension at ambient temperature and cannot be readily removed through conduit 142 and optional pump 180, the system, as illustrated in FIG. 8, permits the build-up of a solid in one or more of the expansion chambers 140 separating extract from the extraction solution while non-selected expansion chambers 140 can be heated with a jacket (not shown) to the melting point of solids or mixed with a minimal amount of a solvent. The solvent can be identical to the extraction solvent and retained by closure of second selection valve 133 prior to closure of first selection valve 131; or the solvent can be a second solvent other than the extraction solvent introduced via a second solvent inlet (not shown). By melting or dissolving, the system allows a fluid extract to be transferred through one or more of the second selection valves 132 and ultimately collected in a receiver 190. When the solvent is not the extraction solvent, portions of optional conduit 143 can be removed or isolated by valves (not shown) such that communication between receiver 190 and condenser 150 does not occur during the continuous operation of the system.

Figure 9:
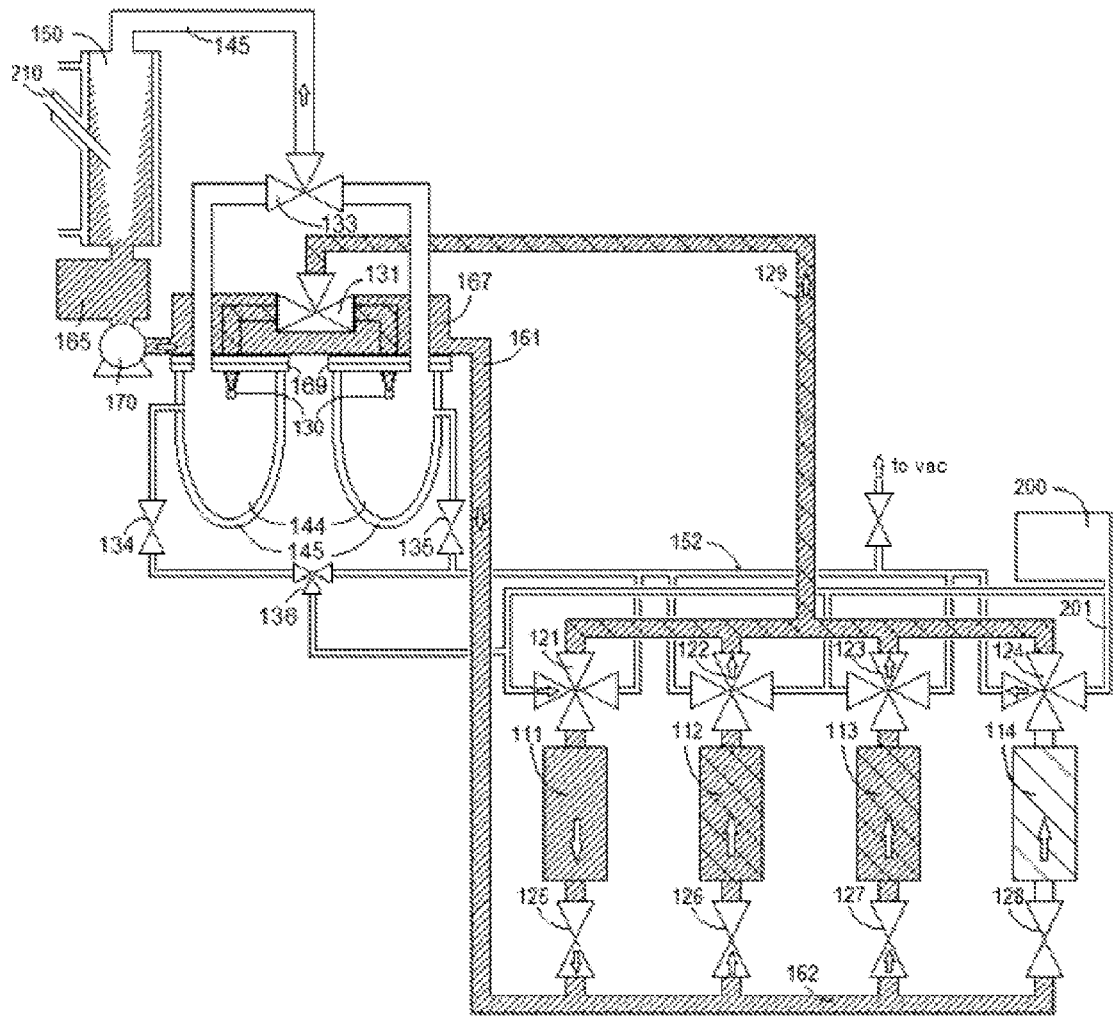
FIG. 9 shows a schematic drawing of a continuous extraction system particularly suited for extraction solvents that are liquids at STP but has a solid extract and employs a plurality of vacuum separation chambers that can be selected to allow removal of solids while operation through one or more other separation chambers, according to an embodiment of the invention.

In an embodiment of the invention, the continuous extraction system, as illustrated in FIG. 9, is configured for isolation of a solid extract employing a solvent that is liquid at STP (standard temperature and pressure), generally with a relatively high boiling point at STP, such as, greater than about 50° C. or greater than about 100° C., and a plurality of expansion chambers that includes a plurality of solids collections vessels 144. In this embodiment of the invention, the solid extract melts at a temperature that is higher than would be desired, for example, but not limited to, when the solvent is mercury and the solid extract is gold and/or other amalgamable metals, or an amalgam of the metal or metals. Although not shown, the system can include heaters and insulating jackets over much of the components to permit maintenance of a temperature in excess of normal room temperatures, for example, but not limited to a temperature greater than about 50° C. or greater than about 100° C., throughout the system. In this manner, a first selection valve 131 and a second selection valve 133 allow the isolation of a solids collection vessel 144 that is mounted to a heat exchanger 167 that includes the extract solution conduits after the first selection valve 131 for introduction of the extract solution through at least one nozzle 130. The nozzle functions as an expansion valve, through which the evaporating solvent is separated from the solids that deposit on the walls of the solids collection vessel 144. The heat exchanger 167 can be coupled with a heat source, not shown, which is in conjunction with the solvent from a solvent reservoir 165, which allows the solvent to be heated before, within, and/or after solvent reservoir 165 or after the pump 170 that is used to pass the hot solvent through the heat exchanger 167 and contact the conduit for the extract solution such that a hot extract solution is expelled through the nozzle 130. A given solids collection vessel 144 can be in the system until removal of the solid extract is desired or the chamber is filled to the point of a loss of separation efficiency. A expansion chamber comprising a solids collection vessel 144 can be isolated from the system via the alignments of the first selection valve 131 and a second selection valve 133 associated with the solids collection vessel 144 and removed at a coupling 169 that permits removal and replacement of the solids collection vessel 144. The solids collection vessel 144 can include a shell 145 which can be an insulating or heating shell and can be fitted with clamps or threads (not shown) to aid in the detachment of the solids collection vessels 144, or shell 145 can be a portion of the heat exchanger 167 where the hot solvent is additionally circulated. Evacuation and pressurizing valves 134 and 135 can be located for pressurization and evacuation of the expansion chamber comprising a solids collection chambers 144 prior to and subsequent to replacing a solids collection chambers 144, respectively, where removal valve 136 is properly aligned.

Figure 10:
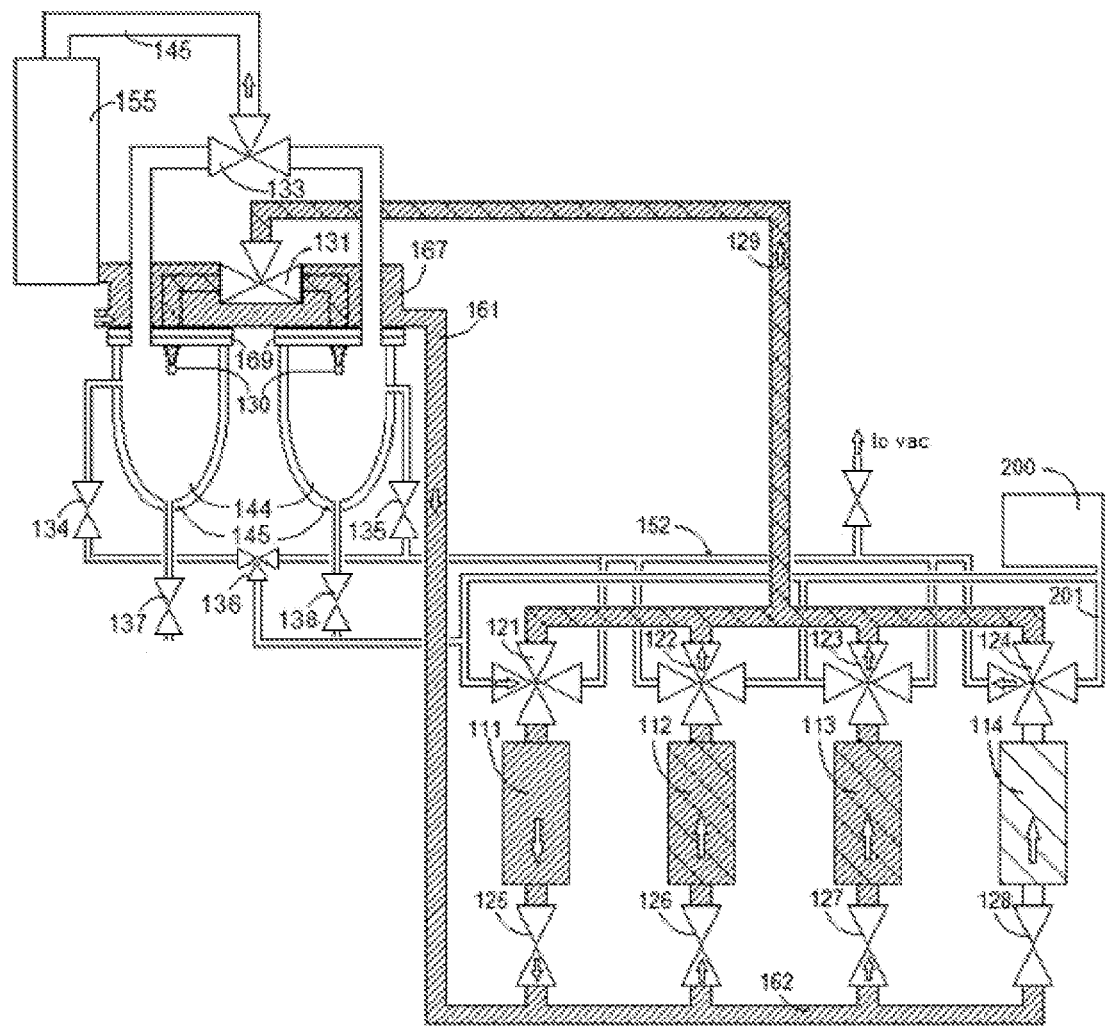
FIG. 10 shows a schematic drawing of a continuous extraction system particularly suited for extraction solvents that are liquids at STP, has a solid extract, employs a plurality of vacuum separation chambers that can be selected to allow removal of solids while operation through one or more other separation chambers, and employs a compressor or diffusion pump to circulate the solvent, according to an embodiment of the invention.

In another embodiment of the invention, the condenser 150, the positive displacement pump 170, the solvent reservoir 165, as shown, in FIG. 9, can be substituted with other means to produce fluid flow 155, as shown in FIG. 10, which allows direct discharge of hot solvent into the heat exchanger 167. The means to cause fluid flow 155 can be a compressor or a diffusion pump. The diffusion pump may be supported by an additional external roughing vacuum pump. The hot solvent vapor output from the compressor may spontaneously condense at the compressor exit pressure and temperature or condensation may require additional cooling with the cooling provided by heat exchange with the expansion of solvent through nozzle 130 within heat exchanger 167. The hot solvent provided to the heat exchanger 167 facilitates vaporization of the solvent of the extraction solution as it exits the nozzle 130. The systems, as illustrated in FIGS. 9 and 10, can include a pressurized gas source 200 connected through a conduit 201 such that a solvent can be forced from a spent extraction chamber 111 and facilitate fill of freshly included extraction chamber 114 containing fresh extractable material with little change in the flow of solvent within conduit 129 after the freshly included extraction chamber 114 is evacuated through evacuating conduit 152. Alternatively, the freshly included extraction chamber 114 can be evacuated before introduction to the system, with proper valve positioning, as would be appreciated by those of skill in the art. As an alternative to that shown in FIG. 9 and illustrated in FIG. 10, the solids collection vessels 144 can be fitted with extract removal valves 137 and 138 where the shell 145 is a heating shell that is coupled to an external heating source (not shown) to permit melting of the solid extract and removal of the extract through the extract removal valves 137 and 138 as a liquid at temperatures in excess of that of the hot solvent that enters heat exchanger 167. By proper alignment of valves, including evacuation and pressurizing valves 134 and 135, the extraction chambers 114 can be pressurized with air or an inert gas to aid in removal of a liquid extract and to evacuate a freshly emptied solids collection vessel 144 before placing in communication with the flow of the system.

It should be understood that examples and embodiments described herein are for illustrative purposes only and that various modifications or changes in light thereof will be suggested to persons skilled in the art and are to be included within the spirit and purview of this application.

We claim:

1. An extraction unit, comprising:
   at least one extraction chamber, wherein the extraction chamber allows containment of an extractable material for extraction by a solvent to form a solution when under a fluid flow;
   a means of providing a fluid flow comprising at least one pump, or at least one compressor; wherein the pump is a positive displacement pump or a diffusion pump, and wherein the means of providing a fluid flow comprises a fluid inlet and a fluid outlet; and at least one heat exchanger comprising at least one expansion chamber directly contacting at least one condenser, at least one fluid output of the means of providing fluid flow, or a portion of the means of providing fluid flow, wherein the at least one expansion chamber is situated upstream of the means of providing a fluid flow and comprises at least one solution inlet comprising at least one expansion valve that allows a pressure drop that promotes vaporization of the solvent from the solution, wherein the at least one extraction chamber is situated upstream of at least one expansion chamber and downstream of the at least one condenser, at least one output of the at least one positive displacement pump, or the portion of the at least one diffusion pump, wherein the solvent in a vaporized state is condensed to a liquid within the condenser, within the means of providing fluid flow, or immediately before the means of providing fluid flow, and wherein heat is absorbed by the expansion chamber.

2. The extraction unit according to claim 1, wherein the means of providing a fluid flow is the at least one compressor.

3. The extraction unit according to claim 1, wherein the means of providing a fluid flow is the at least one positive displacement pump.

4. The extraction unit according to claim 1, wherein the at least one pump is the at least one diffusion pump.

5. The extraction unit according to claim 1, further comprising at least one directing valve wherein the at least one expansion chamber is a plurality of expansion chambers and wherein the at least one directing valve allows directing of the fluid flow between the plurality of expansion chambers.

6. The extraction unit according to claim 5, wherein each of the at least one expansion chamber comprises a solids collection vessel.

7. The extraction unit according to claim 6, further comprising a coupling for attaching and detaching the solids collection vessel from the expansion chamber.

8. The extraction unit of claim 1, further comprising an information processor interfaced with at least one actuator and/or at least one sensor.

9. The extraction unit of claim 8, wherein: the information processor comprises a programmed computer; the sensors comprise, independently or in combination, one or more flow meters, fluid density sensors, refractive index detectors, infra-red, visible or ultraviolet light detectors, and/or conductivity detectors; and the actuators comprise, independently or in combination, one or more valves, pumps, and/or alarms.

10. A method of extracting at least one soluble component from extractable material, comprising:

providing an extraction unit according to claim 1 having at least one extraction chamber containing an extractable material comprising an extractable solute;

flowing a solvent through a first conduit into the at least one extraction chamber, wherein a solution comprising the extractable solute exits the at least one extraction chamber into a second conduit;

flowing the solution comprising the extractable solute from the second conduit into the at least one solution inlet into the at least one expansion chamber, wherein the expansion chamber is maintained at a lower pressure than the pressure in the second conduit, wherein the combined solution comprising the extractable solute is partitioned into a low pressure solvent vapor and an extract comprising the extractable solute and wherein the low pressure solvent vapor is drawn into a means of providing a fluid flow comprising at least one diffusion pump, at least one positive displacement pump, or at least one compressor;

compressing the low pressure solvent vapor to a heated high pressure vapor or condensing the low pressure solvent vapor to a liquid within or at an entrance of the means of providing a fluid flow;

condensing the hot high pressure vapor in at least one condenser or cooling the liquid exiting the means of providing a fluid flow in a portion of the means of providing a fluid flow, or at least one third conduit immediately exiting the means of providing a fluid flow and contacting the at least one expansion chamber, wherein heat from the heated high pressure vapor or the liquid is transferred directly to the expansion chamber and wherein at least one of the expansion chambers and at least one of the condensers or the third conduits comprise at least one heat exchanger; and directing the flow of the solvent exiting the heat exchanger to the first conduit.

11. The method according to claim 10, wherein the solvent is a gas at STP.

12. The method according to claim 10, wherein the solvent is a liquid at STP.

13. The method according to claim 10, wherein the solvent is mercury.

* * * * *